(12) United States Patent
Ichikawa (10) Patent No.: US 9,244,565 B2
(45) Date of Patent: Jan. 26, 2016

(54) ELECTRONIC DEVICE, CONTROL METHOD OF ELECTRONIC DEVICE, PROGRAM, AND STORAGE MEDIUM

(71) Applicant: CANON KABUSHIKI KAISHA, Tokyo (JP)

(72) Inventor: Sho Ichikawa, Ebina (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/794,433

(22) Filed: Jul. 8, 2015

(65) Prior Publication Data

US 2015/0309656 A1    Oct. 29, 2015

Related U.S. Application Data

(62) Division of application No. 14/044,271, filed on Oct. 2, 2013, now Pat. No. 9,104,282.

(30) Foreign Application Priority Data

Oct. 4, 2012 (JP) ................................. 2012-222488

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0412* (2013.01); *G06F 2203/04101* (2013.01); *G06F 2203/04111* (2013.01); *G06F 2203/04112* (2013.01)

(58) Field of Classification Search
CPC ............................. G06F 3/0421; G06F 3/0412
See application file for complete search history.

(56) References Cited

U.S. PATENT DOCUMENTS

| | | | |
|---|---|---|---|
| 8,199,126 B1* | 6/2012 | Taubman | G06F 3/011 345/156 |
| 2011/0018611 A1* | 1/2011 | Newman, Jr. | G06F 3/03547 327/517 |
| 2011/0050620 A1* | 3/2011 | Hristov | G06F 3/044 345/174 |
| 2013/0050141 A1* | 2/2013 | Park | G06F 3/0488 345/174 |
| 2013/0321335 A1* | 12/2013 | Tokutake | G06F 3/044 345/174 |

* cited by examiner

*Primary Examiner* — Ricardo L Osorio
(74) *Attorney, Agent, or Firm* — Cowan, Liebowitz & Latman, P.C.

(57) ABSTRACT

An electronic device having a plurality of electrodes arranged to detect a touch operation onto an operation plane has a control unit for effecting control such that in a case where a capacity of an electrode arranged at an end portion of an arrangement of the plurality of electrodes is equal to or greater than a first capacity, a process corresponding to the touch operation is executed, and in a case where a capacity of another electrode different from the electrode arranged at the end portion is equal to or greater than a second capacity greater than the first capacity, the process corresponding to the touch operation is executed.

18 Claims, 10 Drawing Sheets

ELECTRONIC DEVICE, CONTROL METHOD OF ELECTRONIC DEVICE, PROGRAM, AND STORAGE MEDIUM

CROSS-REFERENCE TO RELATED APPLICATIONS

This application is a divisional of application Ser. No. 14/044,271, filed Oct. 2, 2013 the entire disclosure of which is hereby incorporated by reference.

BACKGROUND OF THE INVENTION

1. Field of the Invention

The present invention relates to an electronic device, a control method of the electronic device, a program, and a storage medium. More particularly, the invention relates to an electronic device for controlling a touch detection threshold value of a touch sensor of an electric capacity type, a control method of the electronic device, a program, and a storage medium.

2. Description of the Related Art

In recent years, the number of electronic devices having touch sensors such as smartphone, digital camera, and the like is increasing. As a type of touch sensor, there are various types such as pressure sensitive type, electric capacity type, optical type, and the like. In any of those types, by setting a threshold value with respect to a change of a sensor output, the presence or absence of a touch input is discriminated. A touch detection sensitivity depends on such a threshold value.

The Official Gazette of Japanese Patent Application Laid-Open No. H05-143226 discloses a coordinate input apparatus in which a sensor area is divided into a plurality of small areas and an individual threshold value is set for every small area, thereby adjusting the touch detection sensitivity in accordance with the area.

The Official Gazette of Japanese Patent Application Laid-Open No. 2010-257046 discloses a method (sensitivity calibration) whereby an electric capacity value in a state where the finger of the user and a dielectric body do not touch an electrode is set to a reference capacity (base line value), and when an input by the finger or the like is detected, approaching and touching states of the finger are detected by using a difference value between the electric capacity value which is output from the electrode and the base line value.

The touch sensor of the electric capacity type discriminates the presence or absence of the touch input by setting the threshold value with respect to the change of the capacity value as a sensor output. The capacity value changes in accordance with an area of a touching portion of a touch input. However, in an end portion of the sensor area, there is a case where the finger of the user or the like happens to touch the sensor area in such a manner that the touch by the finger spreads over the inside and the outside of the sensor area. In such a case, it fails to ensure an enough area of a touch with the inside of the sensor area. There is, consequently, such a problem that if a touching is provided in a manner similar to that in an area in which a provided touch does not include the outside of the sensor area, the capacity value decreases and the touch detection sensitivity deteriorates.

SUMMARY OF THE INVENTION

It is, therefore, an aspect of the invention to improve a precision of a detection of a touch provided at an end portion of an area of a touch sensor of an electric capacity type.

To accomplish the above-described aspect, according to the invention, there is provided an electronic device having a plurality of electrodes arranged to detect a touch operation onto an operation plane, comprising a control unit configured to effect control such that in a case where a capacity of an electrode arranged at an end portion of an arrangement of the plurality of electrodes is equal to or greater than a first capacity, a process corresponding to the touch operation is executed, and in a case where a capacity of another electrode different from the electrode arranged at the end portion is equal to or greater than a second capacity larger than the first capacity, the process corresponding to the touch operation is executed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Figure 1:
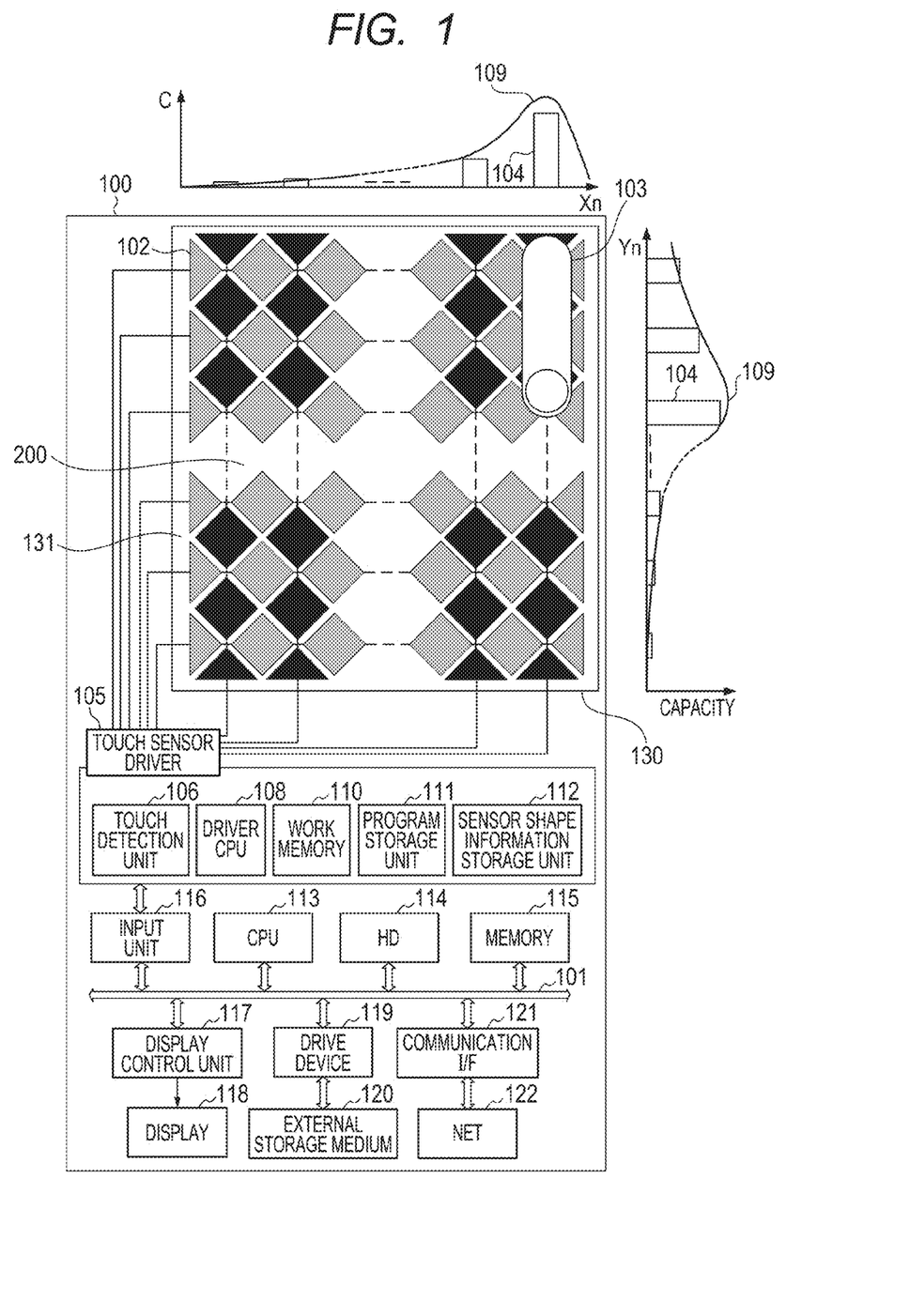
FIG. 1 is a block diagram illustrating a construction of an electronic device in an embodiment of the invention.

FIG. 1 illustrates an example of a construction of an electronic device 100 to which each embodiment of the invention can be applied.

In FIG. 1, a CPU 113, a hard disk (HD) 114, a memory 115, an input unit 116, a display control unit 117, a drive device 119, and a communication interface (I/F) 121, which will be described hereinafter, are connected to an internal bus 101, respectively. The units connected to the internal bus 101 can mutually transmit and receive data through the internal bus 101.

The electronic device 100 has a touch panel 130 on which an operation plane 131 that is touch-operated by the user is provided. Electric capacity touch sensors 102 serving as a plurality of capacity sensors are provided for the touch panel 130. The electric capacity touch sensor 102 causes a capacity 104 between the sensor 102 and an electroconductive member 103 such as a finger or the like touched onto the operation plane 131. For example, the plurality of electric capacity touch sensors 102 are arranged in a two-dimensional plane. An area where the plurality of electric capacity touch sensors 102 are arranged in a two-dimensional plane is called a sensor area 200.

A touch sensor driver 105 is constructed by including a touch detection unit 106, a driver CPU 108, a work memory 110, a program storage unit 111, and a sensor shape information storage unit 112, which will be described hereinafter.

The touch detection unit 106 measures and detects a capacity of each of the electric capacity touch sensors 102.

The driver CPU 108 can make control as will be described hereinafter by developing a program stored in the program storage unit 111 into the work memory 110 and executing it. The driver CPU 108 calculates, for example, a center of gravity 109 from the detected capacity of each of the electric capacity touch sensors 102 and calculates coordinates of a touched position on the sensor area 200 (hereinbelow, referred to as "touch position coordinates"). If the arrangement of the electric capacity touch sensors 102 is an arrangement of two or more dimensions, the center of gravity 109 is individually calculated for every axis. The driver CPU 108 determines a size of electroconductive member 103 from distribution of the capacities 104 in the electric capacity touch sensors 102. The driver CPU 108 informs the CPU 113 of each of the calculated values.

The sensor shape information storage unit 112 stores the area, as position information, where the electric capacity touch sensor 102 of a different sensor shape is arranged. The sensor shape information storage unit 112 and the program storage unit 111 may be constructed by a common nonvolatile storage medium or by different storage media. The sensor shape information storage unit 112 may store data necessary for various kinds of processes and other various kinds of data such as threshold value, judgment condition values, apparatus-peculiar ID, and the like.

Image data, other data, various kinds of programs for allowing the CPU 113, which will be described hereinafter, to operate, and the like are stored into the hard disk 114.

The memory 115 is constructed by, for example, a RAM.

The CPU 113 reads out, for example, the program stored in the hard disk 114 and executes the read-out program by using the memory 115 as a work memory. The CPU 113 controls each unit of the electronic device 100 by executing the program. The program for controlling each unit of the electronic device 100 is not limited to such a construction that it is stored in the hard disk 114. The program may be constructed, for example, so as to be previously stored in a ROM (not shown).

The input unit 116 receives the touch operation by the user, generates a control signal corresponding to the operation, and supplies to the CPU 113.

The CPU 113 controls each unit of the electronic device 100 in accordance with the program on the basis of the control signal which is generated by the input unit 116 in accordance with the touch operation executed to the electric capacity touch sensor 102 (operation plane 131 of the touch panel 130) and is supplied. Thus, the CPU 113 enables the electronic device 100 to execute the operation corresponding to the touch operation.

The display control unit 117 outputs a display signal for allowing the display 118 to display an image. For example, a display control signal generated by the CPU 113 in accordance with the program is supplied to the display control unit 117. On the basis of the display control signal, the display control unit 117 generates a display signal and outputs to the display 118. For example, on the basis of the display control signal generated by the CPU 113, the display control unit 117 allows the display 118 to display a. GUI (Graphical User Interface) screen constructing a GUI. As a display 118, for example, various kinds of display devices such as a liquid crystal display panel and the like are applied.

The electric capacity touch sensor 102 (touch panel 130) and the display 118 can be integratedly constructed. For example, the electric capacity touch sensor 102 is constructed in such a manner that a transmissivity of light does not obstruct the display of the display 118. The sensor 102 is attached to an upper layer of the display plane of the display 118. Input coordinates on the electric capacity touch sensor 102 and display coordinates on the display 118 are made to correspond to each other. Thus, the GUI can be constructed as if the user can directly operate the screen displayed on the display 118.

An external storage medium 120 such as CD or DVD can be loaded into the drive device 119. On the basis of the control of the CPU 113, the drive device 119 reads out data from the loaded external storage medium 120 and writes data into the external storage medium 120. The external storage medium 120 which can be loaded to the drive device 119 is not limited to the disk-shaped storage medium such as CD or DVD. For example, a nonvolatile semiconductor memory such as a memory card or the like may be loaded into the drive device 119.

On the basis of the control of the CPU 113, the communication interface (I/F) 121 communicates with a network (NET) 122 such as LAN or Internet.

On the basis of a notice from the touch sensor driver 105, the CPU 113 can detect the following operations to the sensor area 200 on the operation plane 131. That is, the sensor area 200 is touched by a finger or pen (hereinbelow, referred to as "touch-down"); a state where a finger or pen is in touch with the sensor area 200 (hereinbelow, referred to as "touch-on"); the sensor area 200 is moved with a finger or pen is moved with touching with the sensor area (hereinbelow, referred to as "touch-move"); a finger or pen which is in touch with the sensor area 200 is detached (hereinbelow, referred to as "touch-up"); and a state where nothing is in touch with the sensor area 200 (hereinbelow, referred to as "touch-off").

Those operations and the position coordinates at which the finger or pen is in touch with the sensor area 200 are informed to the CPU 113 through the internal bus 101. On the basis of the informed information, the CPU 113 determines what type of operation is executed onto the sensor area 200. With respect to touch-move, on the basis of a change in coordinates of the touched position, a moving direction of the finger or pen which moves on the sensor area 200 can be determined every vertical component and horizontal component on the sensor area 200. When touch-up is performed from touch-down through predetermined touch-move on the sensor area 200, the finger or pen is considered to have drawn a stroke. The operation to quickly draistroke is called "flick". "flick" is such an operation that the finger is quickly moved by some extent of a distance on the sensor area 200 while keeping the touch with the sensor area 200 and then is merely detached. In other words, it is such an operation that the finger quickly rubs the sensor area 200 as if it is flipped by the finger. If it is detected that the finger is moved by a predetermined distance or longer at a predetermined speed or higher and thereafter touch-up is detected without detecting any other operation, the CPU 113 can determine that "flick" is performed. It is assumed that if it is detected that the finger is moved by a predetermined distance or longer at a speed lower than the predetermined speed, the CPU 113 determines that "drug" is performed.

The operation in each embodiment of the invention will be described hereinbelow with reference to FIGS. 2 to 7.

First Embodiment

In a first embodiment, an example in which a touch detection threshold value different from that in a sensor area center portion 202 is set into a sensor area end portion 201 (peripheral portion of the sensor area 200) is shown. By this construction, a touch detection sensitivity variation caused by an area difference of the touch with the sensor area 200 is improved.

Figure 2:
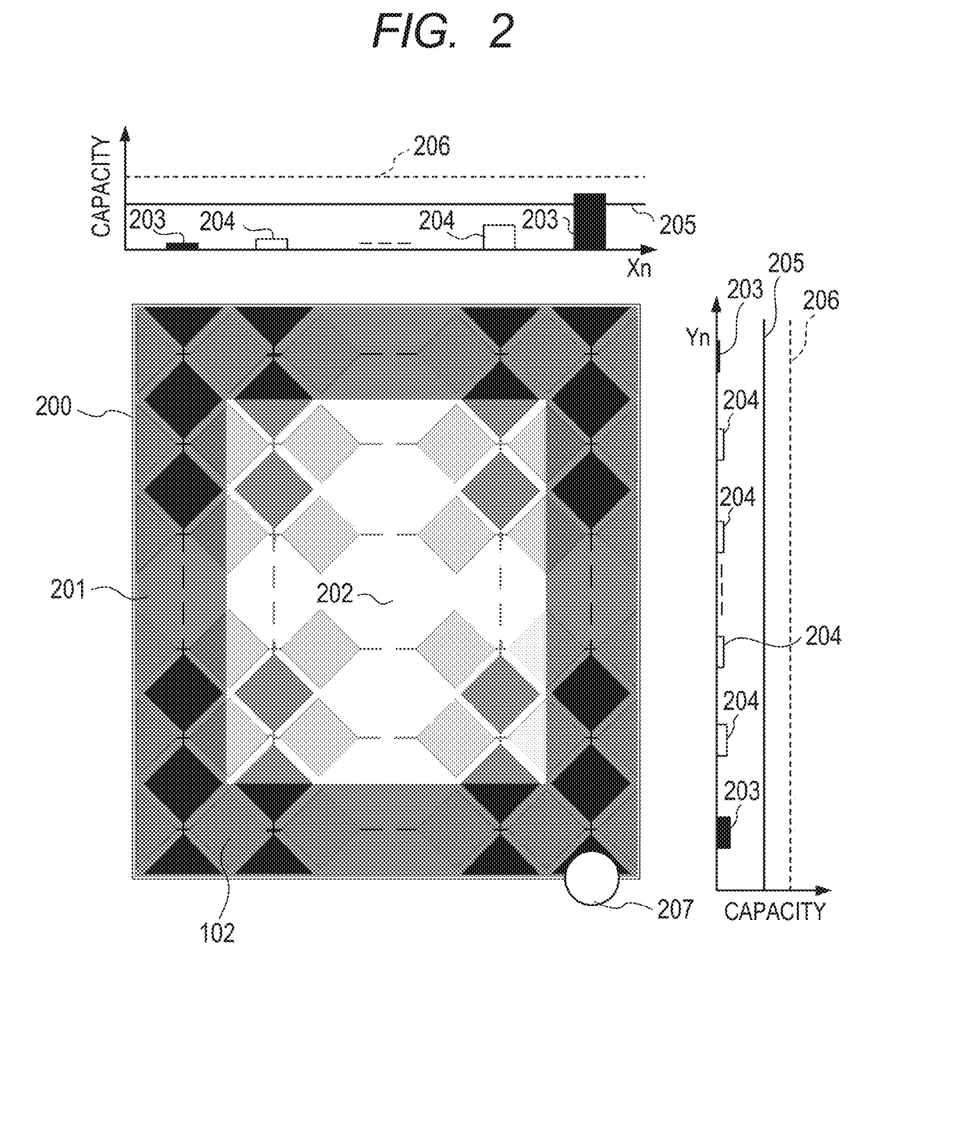
FIG. 2 is a constructional diagram of a touch sensor of an electric capacity type in a first embodiment of the invention.

FIG. 2 is a constructional diagram of the electric capacity touch sensor 102 in the first embodiment.

The sensor area 200 is a portion where the electric capacity touch sensors 102 are arranged. It is assumed that a terminology "sensor" which is used in the following embodiments is a terminology showing each of a plurality of arranged electrodes.

The sensor area end portion 201 is a portion of the sensor area 200, which is very likely to fail to ensure an enough area of a touch on the sensor area 200. For example, a portion of the sensor area 200, where the electric capacity touch sensors 102 of one column in a peripheral portion are arranged is assumed to be the sensor area end portion 201. In FIG. 2, the sensor area end portion 201 is shown in dark gray.

The sensor area center portion 202 is a portion of the sensor area 200, which is very likely to ensure an enough area of a touch on the sensor area 200. In FIG. 2, the sensor area center portion 202 is shown in pale gray.

An end portion sensor capacity 203 (shown in black in FIG. 2) is a capacity of the electric capacity touch sensor 102 existing in the sensor area end portion 201.

A center portion sensor capacity 204 (shown in white in FIG. 2) is a capacity of the electric capacity touch sensor 102 existing in the sensor area center portion 202.

A first capacity 205 is a touch detection threshold value for the end portion sensor capacity 203.

A second capacity 206 is a touch detection threshold value for the center portion sensor capacity 204. The second capacity 206 has a value greater than that of the first capacity 205. The first capacity 205 and the second capacity 206 have previously been stored in the hard disk 114. The first capacity 205 and the second capacity 206 are set as threshold values which the CPU 113 compares with the detection capacity of each electric capacity touch sensor 102 informed from the driver CPU 108.

A touch input 207 is a touch image to the sensor area end portion. It shows that it is very likely to fail to ensure the enough area of the touch on the sensor area 200.

Figure 3:
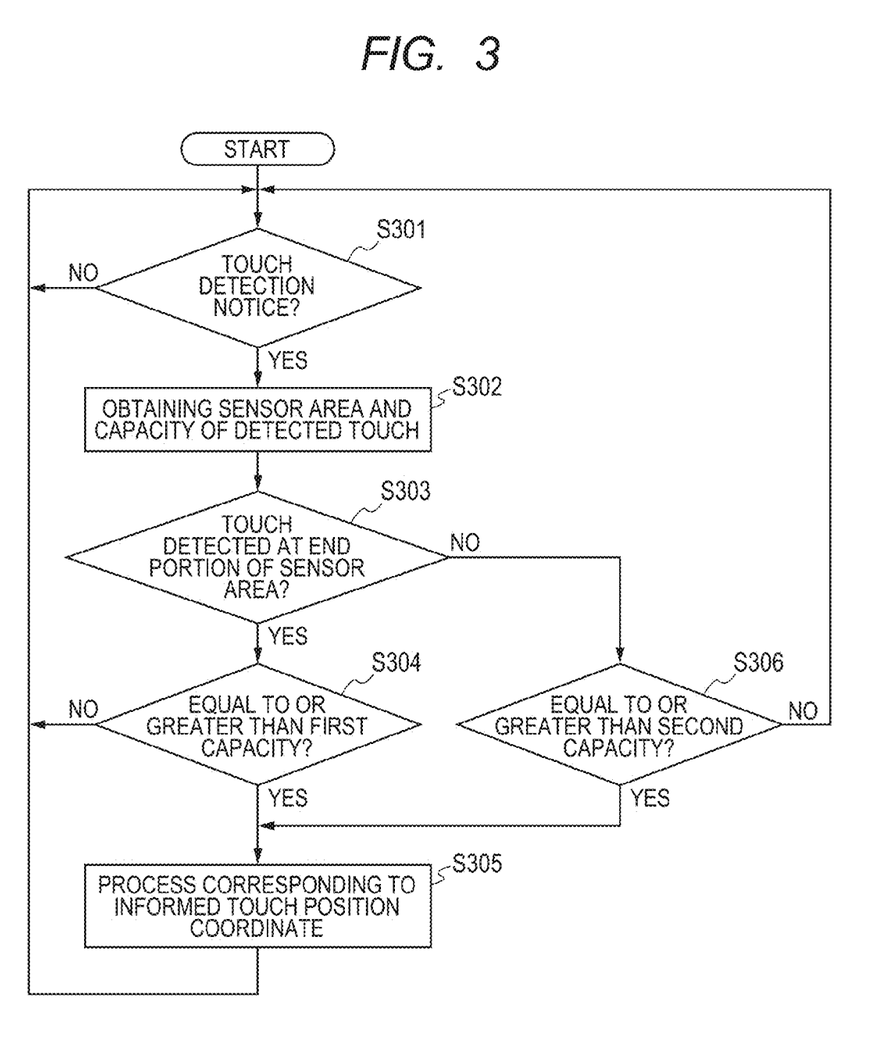
FIG. 3 is a flowchart illustrating a touch detection control process for improving a touch detection sensitivity variation caused by an area difference of a touch provided to a sensor area by setting a touch detection threshold value different from that of a sensor area center portion into a sensor area end portion in the first embodiment of the invention.

FIG. 3 is a flowchart of a touch detection control process in the first embodiment. In the first embodiment, by setting a touch detection threshold value different from that of the sensor area center portion 202 into the sensor area end portion 201, the touch detection sensitivity variation caused by the area difference of the touch with the sensor area 200 is improved. An example of FIG. 3 is not such a process that when the CPU 113 receives a touch detection notice (which will be described hereinafter) from the driver CPU 108, it is not regarded that all touch detection notices are touch-on but is such a process that a touch detection notice which satisfies a judgment condition set on the CPU 113 side is regarded as touch-on. The judgment showing that touch-on is performed is referred to as "touch-on judgment". A program for executing the process in the above flowchart has previously been stored as computer-readable data in the hard disk 114. The CPU 113 reads out the program stored in the hard disk 114, develops into the memory 115, and executes it. Thus, the process shown in the flowchart of FIG. 3 is realized.

In S301, the CPU 113 discriminates whether or not the touch detection notice is informed from the driver CPU 108 side.

The touch detection notice is informed to the CPU 113 from the driver CPU 108 in the case where a capacity which is equal to or greater than a third capacity smaller than the first capacity 205 and the second capacity 206 is detected on the driver CPU 108 side. In the touch detection notice, the following information is informed to the CPU 113. That is, information showing which one of the sensors 102 is the electric capacity touch sensor 102 whose capacity is equal to or greater than the third capacity; the capacity value detected by such an electric capacity touch sensor 102; and touch position coordinates calculated from the capacity value of the electric capacity touch sensor 102 whose capacity is equal to or greater than the third capacity.

The third capacity is a threshold value smaller than the first capacity 205 and the second capacity 206. Therefore, the touch detection notice is a notice of some extent showing that there is a possibility that the display is touched, and it does not always indicate that the finger of the user touched with the display 118. That is, it is also possible to construct in such a manner that a capacity which is detected when the finger of the user approaches the display 118 is set to the third capacity and then the touch detection notice is performed. If it is determined that there is a touch detection notice, the processing routine advances to S302. If NO, the CPU waits for the touch detection notice in S301.

In S302, the CPU 113 stores the foregoing information notified from the driver CPU 108 in the touch detection notice into the memory 115. The touch position coordinates calculated from the capacity value of the electric capacity touch sensor 102 whose capacity is equal to or greater than the third capacity and the capacity value detected by the touch position coordinates may be obtained and stored into the memory 115.

In S303, on the basis of the information obtained in S302, the CPU 113 discriminates whether the sensor area 200 which is touch-detected is a sensor area 200 of the end portion or a sensor area 200 of a portion other than the end portion. That is, the CPU 113 discriminates whether the touch-detected sensor area 200 is a sensor area included in the sensor area end portion 201. If it is determined that the touch-detected sensor area 200 is a sensor area 200 of the end portion, S304 follows. If it is determined that the touch-detected sensor area 200 is a sensor area 200 of a portion other than the end portion, S306 follows.

In S304, the CPU 113 discriminates whether or not the detected capacity in the touch-detected sensor area 200 of the end portion is equal to or greater than the first capacity stored in the hard disk 114. As mentioned above, the first capacity 205 is smaller than the second capacity 206 for touch judgment of the sensor area 200 of a portion other than the sensor area end portion 201. If it is determined that the detected capacity is equal to or greater than the first capacity 205, it is determined that touch-on is performed, and S305 follows. If NO, since it is determined that touch-on is not performed, a process is not particularly executed, the processing routine is returned to S301 to repeat the process.

In S305, the CPU 113 determines that touch-on is performed, and executes various kinds of processes corresponding to the touch position coordinates obtained in the touch detection and stored in the memory 115. For example, a touch icon existing at a position of the touch position coordinates is selected.

In S306, the CPU 113 discriminates whether or not the detected capacity in the sensor area 200 of a portion other than the touch-detected sensor area end portion 201 is equal to or greater than the second capacity stored in the hard disk 114. If it is determined that the detected capacity is equal to or greater than the second capacity 206, it is determined that touch-on is performed, and S305 follows. If NO, since it is determined that touch-on is not performed, then a process is not particularly executed, the processing routine is returned to S301 to repeat the process.

By the above process, control is made on the CPU 113 side in such a manner that touch-on is more liable to be judged in the sensor area end portion 201 as compared with the case of the portion other than the sensor area end portion 201, that is, the touch detection sensitivity rises. By controlling as mentioned above, even in the case of the touch to the sensor area end portion 201 of the electric capacity touch sensor 102, the touch operation can be more certainly detected and the process corresponding to the detected touch operation can be executed.

In the example of FIG. 2, the sensor area end portion 201 is set to the area of one column of the electric capacity touch sensors 102 of the peripheral portion, it is not limited to such an area but may be set to an arbitrary area. Although the first capacity 205 and the second capacity 206 are set for every electric capacity touch sensor 102, they may be set for the touch position coordinates obtained from the driver CPU 108. That is, it is also possible to construct in such a manner that in S303, the CPU 113 discriminates whether or not the touch-detected touch position coordinates are coordinates corresponding to the sensor area end portion 201, and if YES, S304 follows, while If NO, S306 follows.

In order to prevent a deterioration in touch operation feeling in the end portion of the display area of the display 118, in the related art, it is constructed in such a manner that the sensor area end portion of the electric capacity touch sensor 102 does not overlap with the display area of the display 118. Therefore, according to the construction in the related art, it is necessary that the touch panel 130 having the sensor area 200 larger than the display area is arranged in an upper layer of the display 118. On the other hand, according to the present embodiment as mentioned above, the touch operation to the sensor area end portion 201 can be also certainly detected. Therefore, even if a size of sensor area 200 is set to the same size as that of the display area of the display 118, the deterioration in touch operation feeling in the end portion of the display area of the display 118 can be prevented. Therefore, since there is no need to additionally enlarge the sensor area 200, the electronic device 100 can be further miniaturized as compared with the display 118 having the display area of the same size.

Modification of First Embodiment

In the foregoing first embodiment, the process for touch-on discriminating the touch detection notice which satisfies the judgment condition on the CPU 113 side is described. However, the invention is not limited to it. The driver CPU 108 may execute a process for raising the detection sensitivity of the electric capacity touch sensor 102 of the sensor area end portion 201 so as to be higher than that of the electric capacity touch sensor 102 of the sensor area center portion 202.

Figure 4:
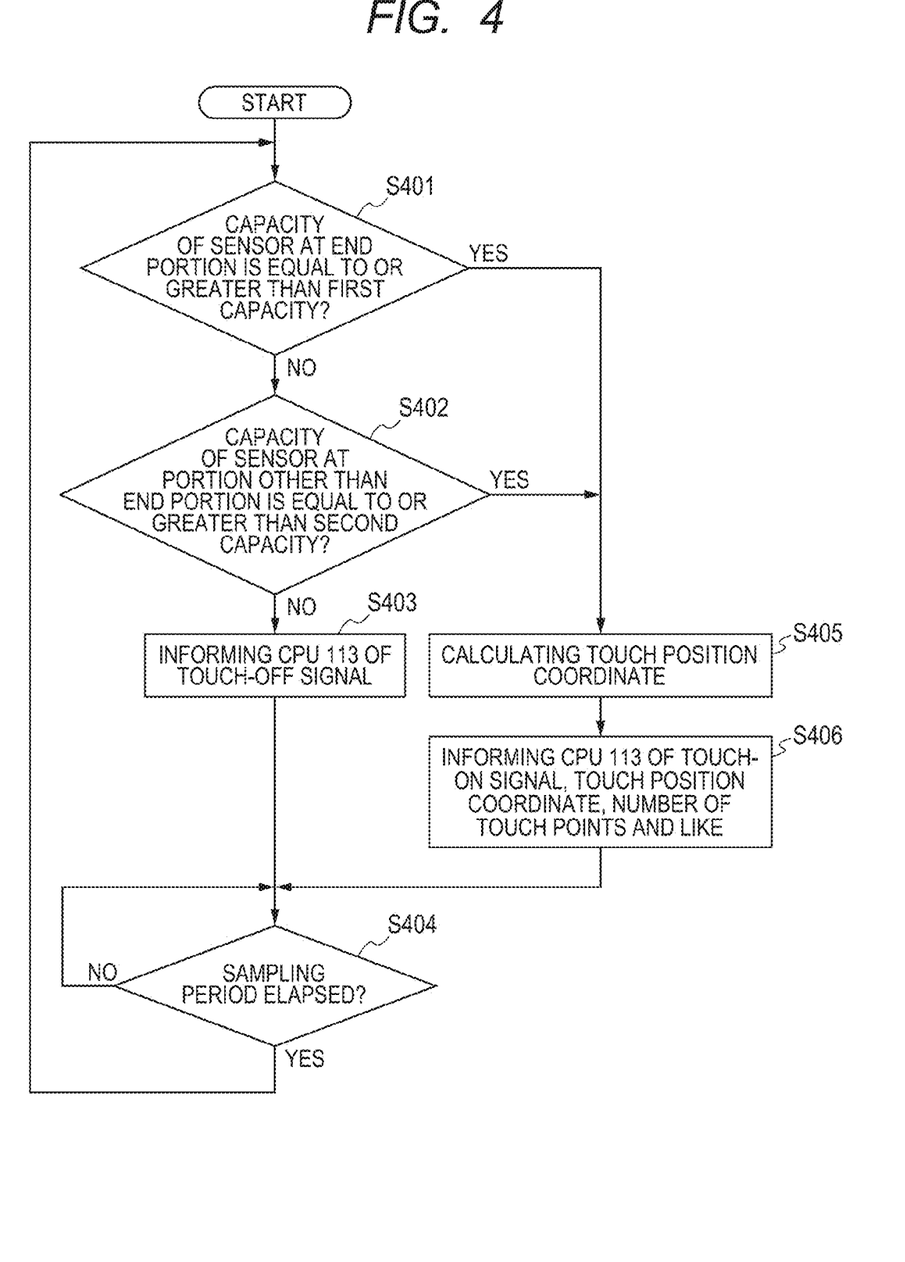
FIG. 4 is a flowchart illustrating a touch detection control process in a second embodiment of the invention.

FIG. 4 is a flowchart for the process for raising the detection sensitivity of the electric capacity touch sensor 102 of the sensor area end portion 201 by the driver CPU 108 side. A program for executing such a process has previously been stored in the program storage unit 111. The driver CPU 108 reads out the program from the program storage unit 111, develops into the work memory 110, and executes it. Thus, the process shown in the FIG. 4 is realized. In this case, it is assumed that the first capacity 205 and the second capacity 206 serving as threshold values have previously been stored in the program storage unit 111.

In S401, the driver CPU 108 discriminates whether or not among the capacities of the electric capacity touch sensors 102 included in the sensor area end portion 201, there is a capacity which is equal to or greater than the first capacity 205. If there is a capacity which is equal to or greater than the first capacity 205, the touch-on judgment is made in the sensor area end portion 201 and S405 follows to calculate touch position coordinates. If the capacity greater than the first capacity 205 is not detected by the electric capacity touch sensor 102 in the sensor area end portion 201, S402 follows.

In S402, the driver CPU 108 discriminates whether or not among the capacities of the electric capacity touch sensors 102 which are not included in the sensor area end portion 201 (that is, the electric capacity touch sensors 102 in the sensor area center portion 202), there is a capacity which is equal to or greater than the second capacity 206 greater than the first capacity 205. If there is a capacity which is equal to or greater than the second capacity 206, the driver CPU 108 makes the touch-on judgment by regarding that the display is touched in the sensor area center portion 202 and S405 follows to calculate touch position coordinates.

In NO in both S401 and S402, it is regarded that touch-on is not performed, and the driver CPU 108 informs the CPU 113 of a touch-off signal in S403.

In S404, the driver CPU 108 discriminates whether or not a sampling period of one time elapses. If the sampling period does not elapse, the CPU waits for the elapse of the sampling period in S404. If the sampling period elapses, the processing routine is returned to S401 to repeat the process.

In S405, the driver CPU 108 calculates touch position coordinates.

In S406, the driver CPU 108 informs the CPU 113 of a touch-on signal and the touch position coordinates calculated in S405. At this time, if a plurality of touch position coordinates are calculated in S405, the driver CPU 108 informs the CPU 113 of the number of touch points showing how many points are simultaneously touched.

As mentioned above, on the driver CPU 108 side, the touch detection sensitivity of the sensor area end portion 201 of the touch panel can be raised so as to be higher than that of the sensor area center portion 202. Thus, the deterioration in touch operation feeling in the end portion of the display area of the display 118 (end portion of the touch panel) can be prevented. At this time, on the CPU 113 side, it is sufficient to execute a process corresponding to the informed touch-on signal and the coordinates (for example, determination process of a touch icon corresponding to the touch position coordinates).

Second Embodiment

In a second embodiment, an example in which a size of touch input (area of a touched portion) is recognized and, on the basis of its result, the sensor area end portion 201 and the sensor area center portion 202 are made variable will be described. In this construction, the touch-on judgment is made by considering an individual difference of the finger size and touching manner with respect to the first embodiment.

Figure 5A:
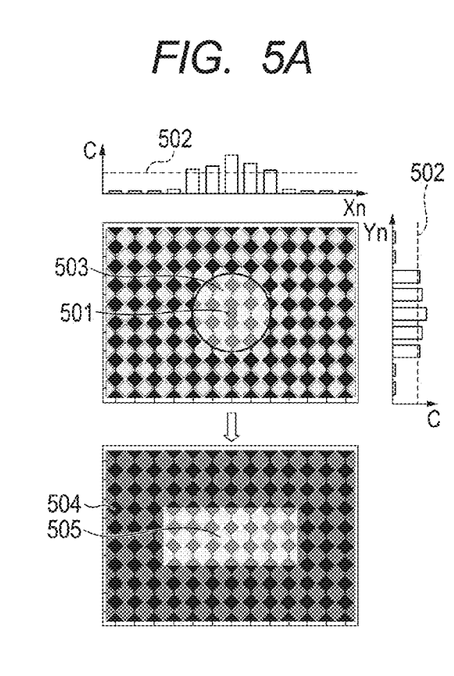
FIGS. 5A, 5B and 5C are explanatory diagrams for judgment of a touch input size in the second embodiment of the invention.
Figure 5B:
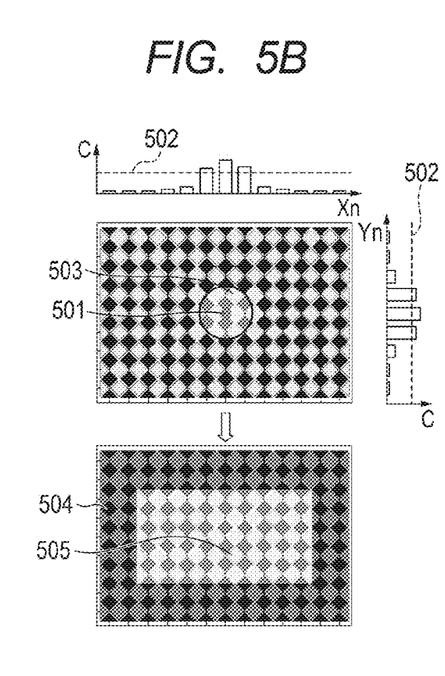
Figure 5C:
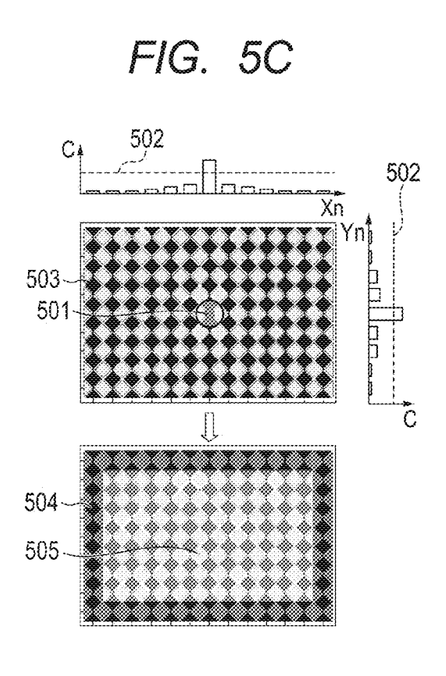

FIGS. 5A to 5C are explanatory diagrams for judgment of a touch input size in the second embodiment. FIGS. 5A to 5C correspond to flowcharts of FIGS. 6A and 6B, which will be described hereinlater.

A target point 501 illustrated in FIGS. 5A to 5C is a point which becomes a target for allowing the user to touch at the time of judgment of the touch input size.

A third capacity 502 is a touch input size determination threshold value to the capacity 104. At the time of a touch input to the target point 501, a size of touch input 503 is discriminated (recognized) in accordance with the number of electric capacity touch sensors 102 whose capacities are equal to or greater than the third capacity 502.

The touch input 503 is an area of a touch provided to the target point 501 and differs in dependence on the finger size and touching manner of the user. In an upper stage of each of FIGS. 5A to 5C, the touch input 503 is schematically illustrated by a pale gray circle which is concentric to the target point 501.

A judgment sensor area end portion 504 is a portion of the sensor area 200, which is very likely to fail to ensure an enough area of a touch on the sensor area 200. In each of FIGS. 5A to 5C, the sensor area end portion 504 is shown in dark gray.

A sensor area center portion 505 is a portion of the sensor area 200, which is very likely to ensure an enough area of a touch on the sensor area 200. In each of FIGS. 5A to 5C, the sensor area center portion 204 is shown in pale gray.

Figure 6A:
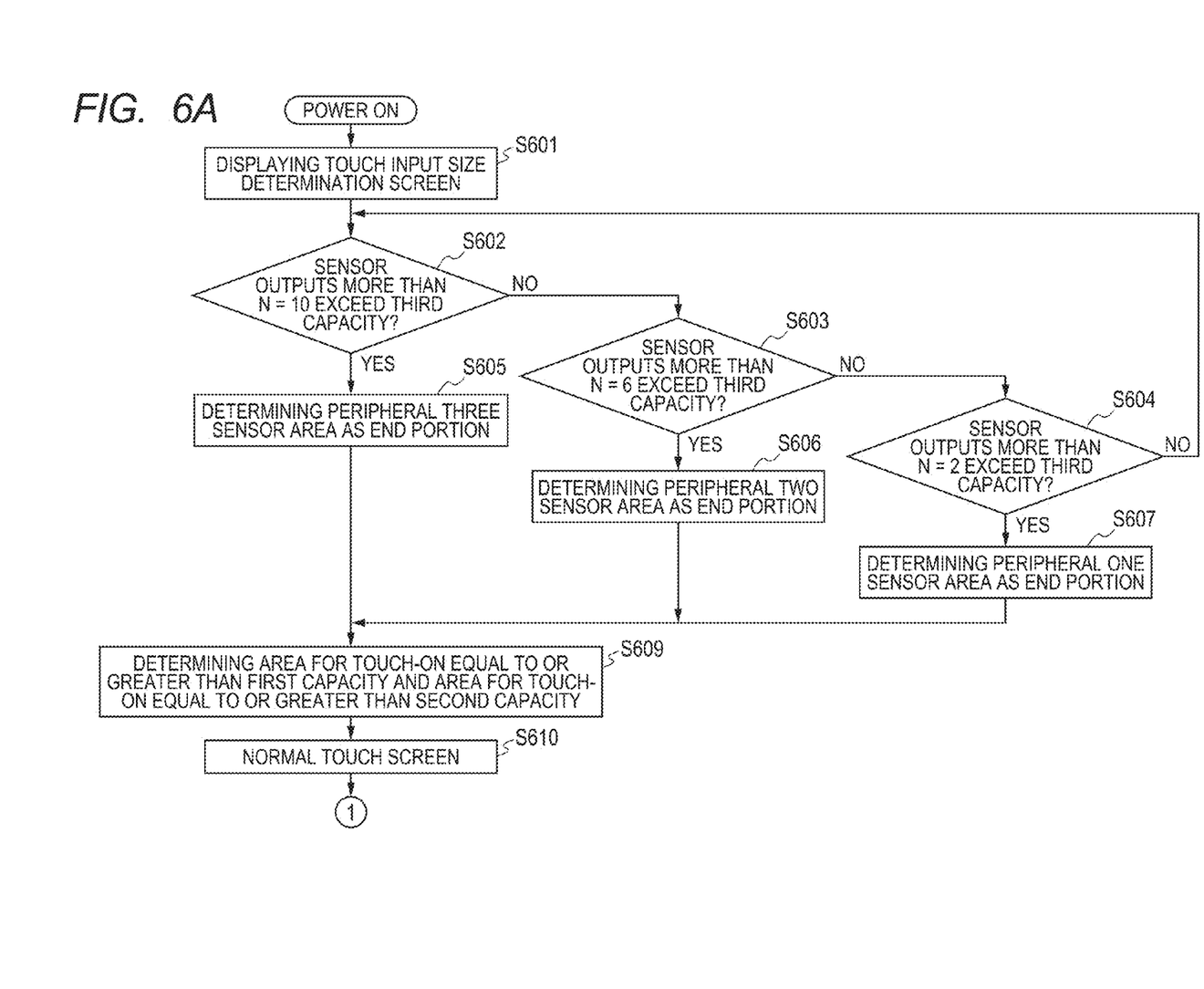
FIGS. 6A and 6B are flowcharts illustrating the touch detection control process in the second embodiment.
Figure 6B:
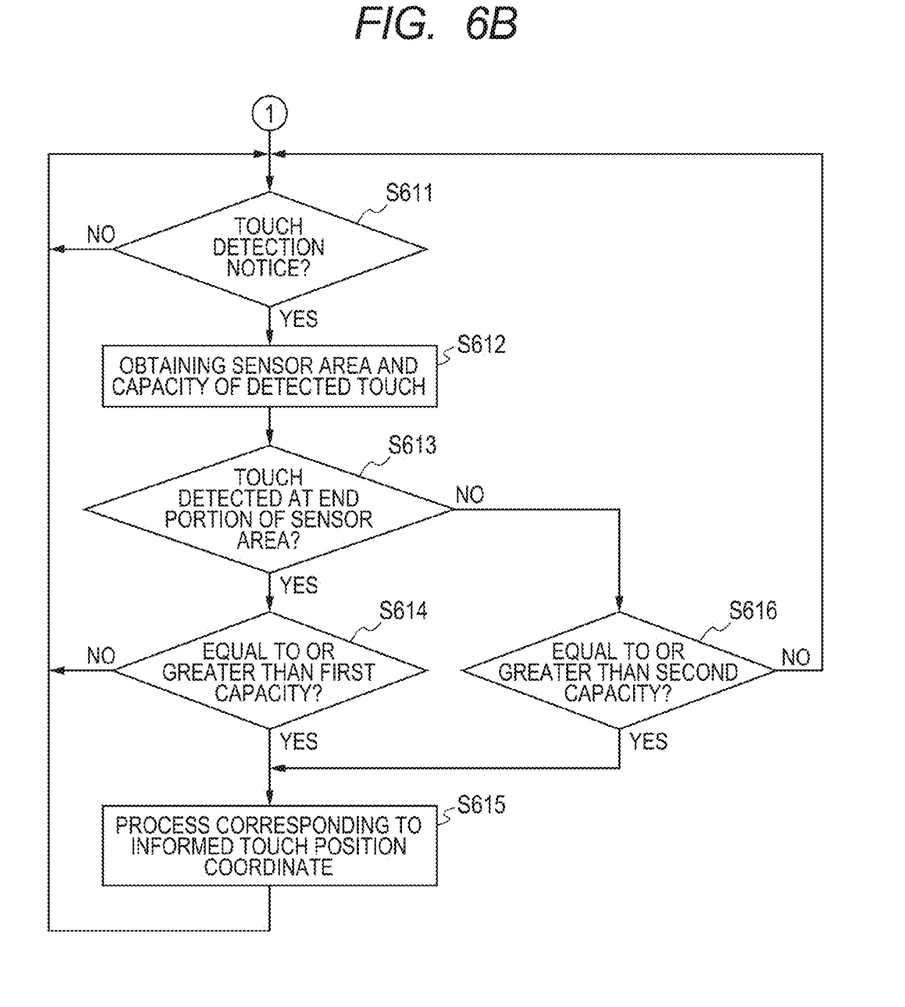

FIGS. 6A and 6B are flowcharts illustrating the touch detection control process in the second embodiment. In the second embodiment, a touch detection sensitivity variation caused by a difference of an area of a touch onto the sensor area 200 is improved by considering an individual difference of the finger size and touching manner. A program for executing the process in the above flowchart has previously been stored in the hard disk 114. The CPU 113 reads out the program stored in the hard disk 114, develops into the memory 115, and executes it. Thus, the process shown in FIGS. 6A and 6B is realized.

Since processing steps S611 to S616 in FIG. 6B are similar to those in S301 to S306 in FIG. 3 described in the first embodiment, their description is omitted here.

Figure 7:
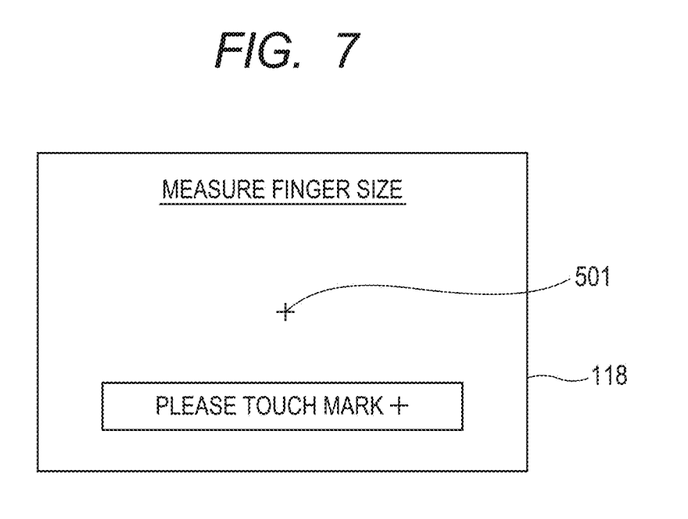
FIG. 7 is a diagram illustrating a display example of a touch input determination screen.

In S601, the CPU 113 displays a touch input determination screen on the display 118 and advances to S602. FIG. 7 illustrates a display example of the touch input determination screen. The target point 501 is displayed and a guidance for promoting the user to touch the target point 501 is displayed. On this display screen, the user touches the target point 501. The target point 501 is displayed in the screen center portion, that is, at a position other than the sensor area end portion 201. Therefore, when the user touches the target point 501, the touched portion by the touch does not spread over the sensor area end portion 201 but the whole touched portion can be detected.

In S602, a size of area of the touch input 503 (portion touched by the user) is discriminated (recognized). In a discrimination result, if the capacities of the electric capacity touch sensors 102 of N=10 or more exceed the third capacity, S605 follows. On the other hand, in the discrimination result, if the capacities of the electric capacity touch sensors 102 less than N=10 exceed the third capacity, S603 follows. N denotes the number of electric capacity touch sensors 102.

In S603, the discrimination (recognition) about the size of the touch input 503 by the user is continuously performed. As a result of the discrimination, if the capacities of the electric capacity touch sensors 102 of N=6 or more exceed the third capacity, S606 follows. On the other hand, if the capacities of the electric capacity touch sensors 102 less than N=6 exceed the third capacity, S604 follows.

In S604, the CPU 113 continuously performs the discrimination (recognition) about the size of the touch input 503 by the user. As a result of the discrimination, if the capacities of the electric capacity touch sensors 102 of N=2 or more exceed the third capacity, S607 follows. If NO, the processing routine is returned to S602 to wait for the touch input 503 from the user.

In S605, as illustrated in FIG. 5A, the CPU 113 determines that the electric capacity touch sensors 102 of peripheral three columns are a sensor area end portion 201, and advances to S609.

In S606, as illustrated in FIG. 5B, the CPU 113 determines that the electric capacity touch sensors 102 of peripheral two columns are a sensor area end portion 201, and advances to S609.

In S607, as illustrated in FIG. 5C, the CPU 113 determines that the electric capacity touch sensors 102 of peripheral one column are a sensor area end portion 201, and advances to S609.

In S609, the CPU 113 sets an area where the touch-on judgment is made when the capacities are equal to or greater than the first capacity 205 and an area where the touch-on judgment is made when the capacities are equal to or greater than the second capacity 206. Specifically speaking, the CPU 113 sets the area determined as a sensor area end portion 201 in S605 to S607 as an area where the touch-on judgment is made when the capacities are equal to or greater than the first capacity. The CPU 113 sets the area which is not determined as a sensor area end portion 201 (sensor area 200 of a portion other than the end portion) as an area where the touch-on judgment is made when the capacities are equal to or greater than the second capacity.

As mentioned above, according to the second embodiment, the uniform touch detection sensitivity which is not deviated can be provided to the sensor area 200 by considering an individual difference of the finger size and touching manner. In the explanatory diagram for the touch input size discrimination in FIG. 4, although the number of sensors in the X direction is set to 13 and the number of sensors in the Y direction is set to 9, they may be set to different numbers. The number of electric capacity touch sensors 102 serving as a reference upon execution of the size determination of the area of the touched portion may be set to an arbitrary number. Further, although the judgment sensor area end portion 504 is set to the electric capacity touch sensors 102 of peripheral X columns, it may be set using the position coordinates.

Third Embodiment

In a third embodiment, an example in which by determining a sensor area of a different sensor shape as a sensor area end portion, the first embodiment is performed at a higher precision will be described.

Figure 8:
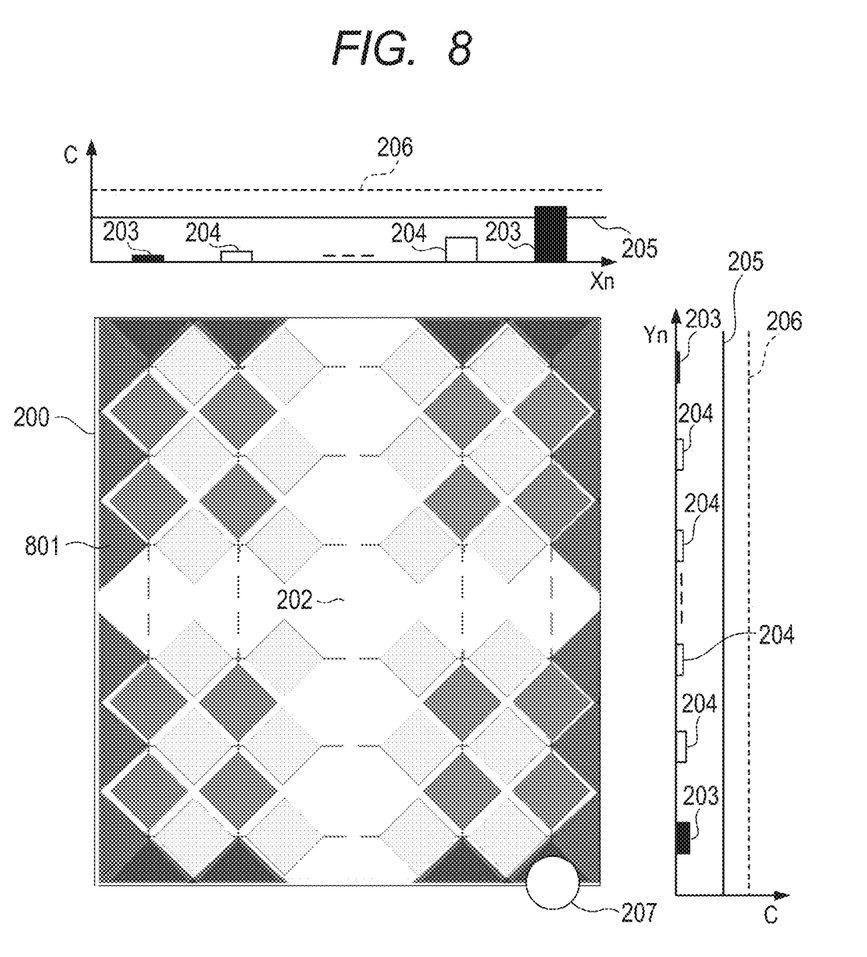
FIG. 8 is a constructional diagram of a touch sensor of an electric capacity type in a third embodiment of the invention.

FIG. 8 is a constructional diagram of a touch sensor of an electric capacity type in the third embodiment of the invention.

A sensor area 801 of a different sensor shape is a portion of the sensor area 200, which is very likely to fail to ensure an enough area of a touch on the sensor area 200. In FIG. 8, the sensor area 801 of the different sensor shape is shown in dark gray. The electric capacity touch sensor 102 of a shape different from that of another area is arranged in the sensor area 801 of the different sensor shape.

Figure 9:
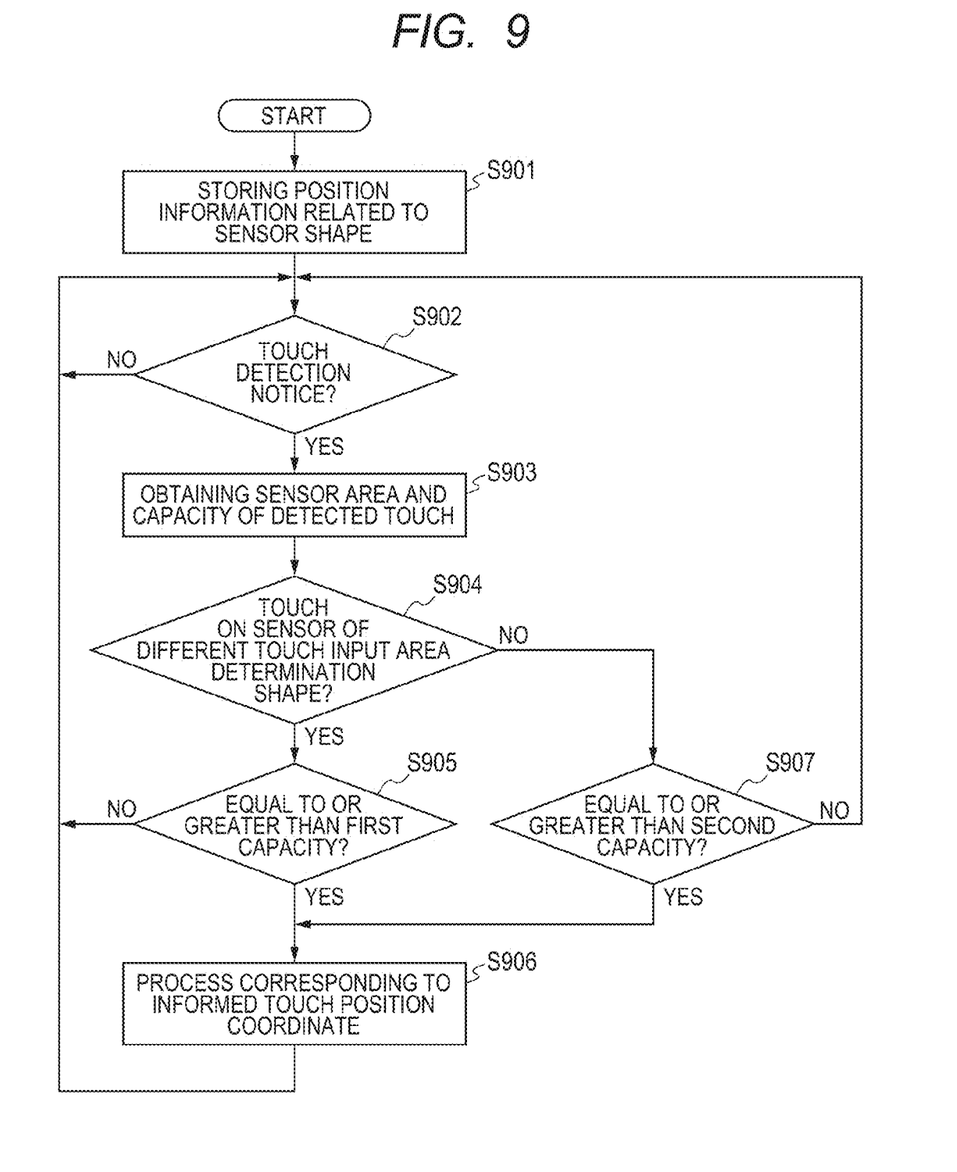
FIG. 9 is a flowchart illustrating a touch detection control process in the third embodiment of the invention.

FIG. 9 is a flowchart illustrating a touch detection control process in the third embodiment of the invention. In the third embodiment of the invention, the sensor area 801 of the different sensor shape is determined as a sensor area end portion 201 and a touch detection sensitivity variation caused by a difference of an area of a touch onto the sensor area 200 is improved. A program for executing the process in the above flowchart has previously been stored in the hard disk 114. The CPU 113 reads out the program stored in the hard disk 114, develops into the memory 115, and executes it. Thus, the process shown in FIG. 9 is realized.

Since processing steps S902 and S905 to S907 in FIG. 9 are similar to those in S301 and S304 to S306 in FIG. 3 described in the first embodiment, their description is omitted here.

In S901, the CPU 113 stores position information regarding the sensor shape into the sensor shape information storage unit 112, and advances to S902. Information of the position where the electric capacity touch sensor 102 of the different shape is arranged is included in the position information regarding the sensor shape.

In S904, the CPU 113 discriminates the position of the touched area. Specifically speaking, the CPU 113 compares the stored position information regarding the sensor shape with the obtained position coordinates and discriminates whether or not the touch with the electric capacity touch sensor 102 arranged in the sensor area 801 of the different sensor shape is performed. If the touch with the electric capacity touch sensor 102 arranged in the sensor area 801 of the different sensor shape is performed, it is regarded that the touched position is the sensor area end portion 201, and S905 follows. On the other hand, if the touch with the electric capacity touch sensor 102 arranged in the sensor area 801 of the different sensor shape is not performed, it is regarded that the touched position is not the sensor area end portion 201, and S907 follows.

Although the exemplary embodiments of the invention have been described above, the invention is not limited to those embodiments but many modifications and variations are possible within a range of a spirit of the invention.

The control of the CPU 113 or driver CPU 108 may be performed by one hardware or the whole apparatus may be controlled by sharing the process by a plurality of hardware.

Although the invention is described in detail above on the basis of the exemplary embodiments, the invention is not limited to those specific embodiments but various modifications within a range without departing from the spirit of the invention are also incorporated in the invention. Further, each of the foregoing embodiments merely shows an embodiment of the invention and those embodiments can be also properly combined.

Although the embodiments have been described with respect to the case where the invention is applied to the electronic device having the touch panel as an example, the invention is not limited to such an example but can be applied to any of various types of apparatuses each having the touch panel. That is, the invention can be applied to a digital still camera, a digital video camera, a personal computer, a PDA, a cellular phone terminal, a portable image viewer, a printer apparatus having a display, a digital photo frame, a music player, a gaming apparatus, an electronic book reader, and the like.

Another Embodiment

The invention is also realized by executing the following processes. That is, software (program) for realizing the functions of the embodiments mentioned above is supplied to a system or an apparatus through a network or various kinds of storage media, a computer (or a CPU or MPU) of the system or apparatus reads out a program code, and executes processes based on it. In this case, the program and the storage medium in which the program is stored construct the invention.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222488 filed on Oct. 4, 2012, which is hereby incorporated by reference herein in its entirety.

What is claimed is:

1. An electronic device comprising:
   a plurality of electrodes arranged to detect a touch operation onto an operation plane; and
   a control unit configured to effect control such that in a case where a capacity of an electrode arranged at an end portion of an arrangement of the plurality of electrodes is equal to or greater than a first capacity, a process corresponding to the touch operation is executed, and in a case where a capacity of another electrode different from the electrode arranged at the end portion is equal to or greater than a second capacity greater than the first capacity, the process corresponding to the touch operation is executed.

2. A device according to claim 1, wherein even in a case where the capacity of another electrode different from the electrode arranged at the end portion among the plurality of electrodes is equal to or greater than the first capacity, if it is less than the second capacity, the control unit does not control to execute the process corresponding to the touch operation.

3. A device according to claim 1, further comprising a setting unit configured to set which electrodes arranged at positions starting from the end portion of the arrangement of the plurality of electrodes as electrodes for which the process corresponding to the touch operation is to be executed in a case where the capacity value is equal to or greater than the first capacity.

4. A device according to claim 3, further comprising a recognizing unit configured to recognize a size of a body which effects the touch operation onto the operation plane,
   wherein on the basis of the size recognized by the recognizing unit, the setting unit sets the electrodes which are included in a wider area as the size is larger, as the electrodes for which the process corresponding to the touch is to be executed in a case where the capacity is equal to or greater than the first capacity.

5. A device according to claim 4, wherein in the case where the operation plane is touched in a recognition mode for displaying a guidance for promoting the touch to a display unit together with a mark serving as a target of the touch, the recognizing unit recognizes the size of the body which performs the touch.

6. A device according to claim 1, wherein the electrode arranged at the end portion is of a shape different from that of another electrode and has an area smaller than that of another electrode.

7. A device according to claim 1, further comprising a display unit which is constructed integratedly with the plurality of electrodes such that a display plane serves as the operation plane and a size of the display plane is the same as that of an area where the plurality of electrodes are arranged.

8. An electronic device comprising:
a plurality of electrodes arranged for detecting a touch onto an operation plane;
an output unit configured to output a signal showing that the touch is detected when a capacity of the electrode arranged at an end portion of an arrangement of the plurality of electrodes is equal to or greater than a first capacity; and
a control unit configured to control in such a manner that in a case where a capacity of another electrode different from the electrode arranged at the end portion among the plurality of electrodes is equal to or greater than a second capacity greater than the first capacity, the signal showing that the touch is detected is output.

9. A device according to claim 8, wherein even in a case where the capacity of another electrode different from the electrode arranged at the end portion among the plurality of electrodes is equal to or greater than the first capacity, if it is less than the second capacity, the control unit does not control to output the signal showing that the touch is detected.

10. A device according to claim 8, further comprising a setting unit configured to set which electrodes arranged at positions starting from the end portion of the arrangement of the plurality of electrodes as electrodes for which the signal showing that the touch is detected to be output in a case where the capacity is equal to or greater than the first capacity.

11. A device according to claim 10, further comprising a recognizing unit configured to recognize a size of a body which effects the touch operation onto the operation plane,
wherein on the basis of the size recognized by the recognizing unit, the setting unit sets the electrodes which are included in a wider area as the size is larger as the electrode for which the signal showing that the touch is detected is to be output in a case where the capacity is equal to or greater than the first capacity.

12. A device according to claim 11, wherein in the case where the operation plane is touched in a recognition mode for displaying a guidance for promoting the touch to a display unit together with a mark serving as a target of the touch, the recognizing unit recognizes the size of the body which performs the touch.

13. A device according to claim 8, wherein the electrode arranged at the end portion is of a shape different from that of another electrode and has an area smaller than that of another electrode.

14. A device according to claim 8, further comprising a display unit which is constructed integratedly with the plurality of electrodes such that a display plane serves as the operation plane and a size of the display plane is the same as that of an area where the plurality of electrodes are arranged.

15. A control method of an electronic device having a plurality of electrodes arranged to detect a touch operation onto an operation plane, comprising:
a processing step of executing a process corresponding to the touch operation; and
a control step of controlling the processing step such that in a case where a capacity of an electrode arranged at an end portion of an arrangement of the plurality of electrodes is equal to or greater than a first capacity, a process corresponding to the touch operation is executed, and in a case where a capacity of another electrode different from the electrode arranged at the end portion is equal to or greater than a second capacity greater than the first capacity, the process corresponding to the touch operation is executed.

16. A non-transitory computer-readable storage medium storing a program comprising a program code for causing a computer to execute a control method according to claim 15.

17. A control method of an electronic device having a plurality of electrodes arranged to detect a touch onto an operation plane, comprising:
an output step of outputting a signal showing that the touch is detected when a capacity of the electrode arranged at an end portion of an arrangement of the plurality of electrodes is equal to or greater than a first capacity; and
a control step of controlling the output step such that in a case where a capacity of another electrode different from the electrode arranged at the end portion among the plurality of electrodes is equal to or greater than a second capacity greater than the first capacity, the signal showing that the touch is detected is output.

18. A non-transitory computer-readable storage medium storing a program comprising a program code for causing a computer to execute a control method according to claim 17.

* * * * *